H. W. PLEISTER.
CONDUIT AND CABLE CLAMP.
APPLICATION FILED JAN. 8, 1919.
1,313,113.  Patented Aug. 12, 1919.
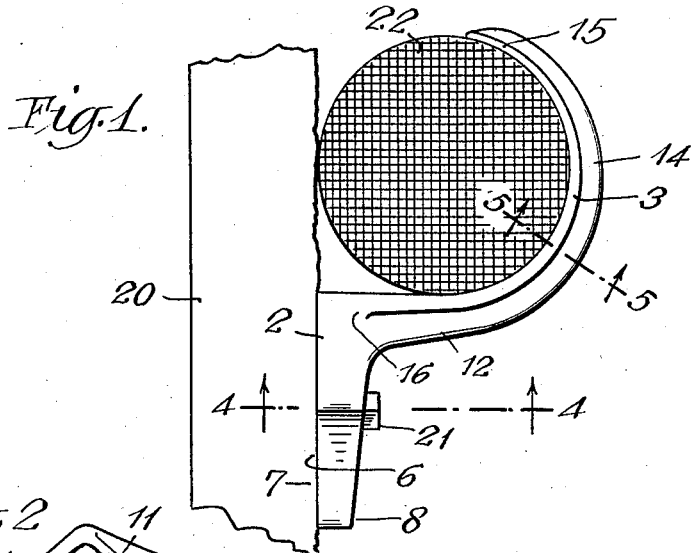
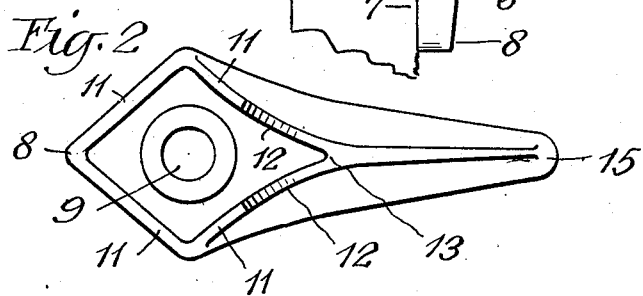
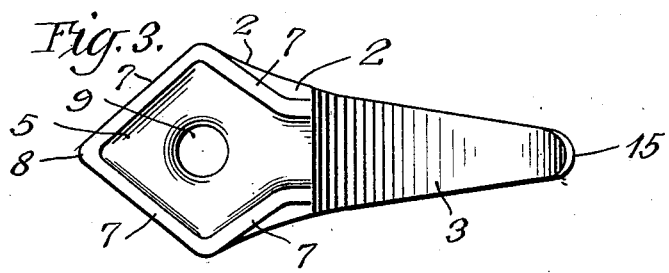
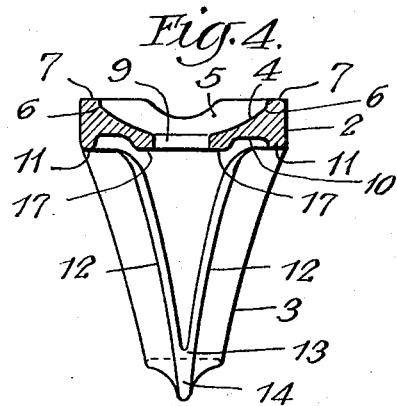
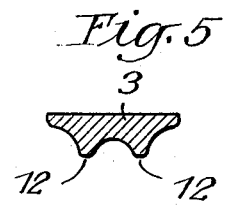
Henry W. Pleister INVENTOR
BY Alan M. Johnson ATTORNEY
THE COLUMBIA PLANOGRAPH CO., WASHINGTON, D. C.

UNITED STATES PATENT OFFICE.

HENRY W. PLEISTER, OF WESTFIELD, NEW JERSEY, ASSIGNOR TO HENRY B. NEWHALL, JR., EXECUTOR OF HENRY B. NEWHALL, DECEASED.

CONDUIT AND CABLE CLAMP.

1,313,113.  Specification of Letters Patent.  Patented Aug. 12, 1919.

Application filed January 8, 1919.  Serial No. 270,119.

*To all whom it may concern:*

Be it known that I, HENRY W. PLEISTER, a citizen of the United States, residing at Westfield, in the county of Union and State of New Jersey, have invented certain new and useful Improvements in Conduit and Cable Clamps, of which the following is a specification, taken in connection with the accompanying drawing.

My invention relates to conduit and cable clamps which are also used to support pipes or similar articles, and more particularly it relates to such a clamp which will contain the minimum amount of metal for the maximum strength of clamp.

My invention further relates to certain detail of construction all of which will be more fully hereinafter described and pointed out in the claims.

Figure 1 is a side elevation of my improved clamp shown supporting a cable which is shown in vertical section, Fig. 2 is a reverse plan view of my clamp, Fig. 3 is a plan view of my clamp.

Fig. 4 is a section substantially on the line 4—4 of Fig. 1 looking in the direction of the arrows.

Fig. 5 is a section on the line 5—5 of Fig. 1 looking in the direction of the arrows.

In my invention the conduit and cable clamp 1 consists of a base 2 and a hook 3. The base portion may be given different contours but preferably, to insure the maximum distribution of bearing surface or points of contact with the least possible weight, I make the base portion substantially in the form of a diamond, one end of the diamond merging into the hook number 3. This base 2 I preferably form of a comparatively thin web 4 which is concave at 5 on the bearing surface 6, this surface being the surface which contacts with, or is next to, the wall or other support 20. Along the outer edge of the bearing surface 6 I form reinforcing ribs 7 which are the surfaces which actually contact with the wall or the other support 20 and tend to bite into it and prevent side rocking of the clamp. The toe 8 of the diamond is spaced a sufficient distance from the hole 9, for the bolt 21 or other supporting means, to insure a good leverage against the clamp being pried away from the wall by any jars or strains that may be thrown upon it.

The under surface 10 of the web 4 is also provided with reinforcing ribs 11, 11 which extend around the edges of the base 2 and merge into the reinforcing ribs 12, 12 which extend out along a portion of the hook member 3, sufficiently far to assist in taking the heavy downward strain of the conduit, cable 22 or pipe with which the clamp is used.

These double reinforcing ribs 12, 12 extend out on the hook member 3 to the point 13 from which point they merge into a single reinforcing rib 14 of gradually decreasing height to the end 15 of the hook member 3.

From substantially the point 13 to the end 15 of the hook member, the principal strain or stress thrown upon the clamp is outward. The one rib 14, preferably centrally located, amply takes this strain avoiding the necessity of running the ribs 12, 12 past the point 13.

Where the base member 2 and the hook member 3 join at 16 is the weakest point of the clamp. I therefore form the ribs 12, 12 of the greatest height and of greatest thickness at this point letting them, and the single rib 14, gradually taper as previously described.

On the lower surface 10 of the base 2 I preferably form a raised ring 17 which is elevated from the web so that a bolt head 21 may bear upon it and be at substantially the same elevation from the web as the outer reinforcing ribs 11, 11. This will permit the bolt head 21 to be easily manipulated with a wrench and will insure easy turning of the bolt without undue friction on the under side of the head.

In my invention it will be noted that with the clamp in the position shown in Fig. 1, I have double reinforced ribs 12, 12 where the greatest strain is thrown upon the clamp which comes from the downward strain of the conduit or cable 22 or pipe with which it is used. From the point where the greatest strains cease, which is approximately the point 13 I employ only one strengthening rib 14 which rib diminishes in height from this point 13 toward the end of the hook member. This single rib 14 compensates for the outward strain on the hook member. By this construction I insure the greatest strength where it is most needed, accomplish a considerable saving of metal, and obtain a light and strong clamp.

By having the base 2 strengthened along its outer edges by reinforcing ribs 7, 7 and 11, 11, I am able to use a comparatively thin web 4. My entire clamp is a unitary structure which is preferably cast at one operation out of malleable iron, though any other suitable metal may be used. By arranging the bearing surface 4 concave I not only save metal but prevent teetering or rocking of the clamp against a comparatively rough stone or concrete wall 20, for the bearing surface will be confined to the reinforcing ribs 7, 7 which serve to steady the bearing of the clamp and have a tendency to bite into the wall. All these features serve to make a clamp of the maximum strength with the minimum weight of metal used and one of great utility.

Having thus described this invention in connection with an illustrative embodiment thereof, to the details of which I do not desire to be limited, what is claimed as new and what is desired to secure by Letters Patent is set forth in the appended claims.

What I claim is:

1. A new article of manufacture comprising a conduit and cable clamp having a base, a hook member, a double reinforcing rib on the hook member extending out from the base for a portion of the length of the hook member sufficiently far to substantially assist in taking the downward strain of the conduit or cable, and from that point said double reinforcing ribs merging into a single reinforcing rib which extends to substantially the end of the hook member and assists in taking the outward strain of the conduit or cable.

2. A new article of manufacture comprising a conduit and cable clamp having a comparatively thin web base having reinforcing ribs extending around its bearing surface, a hook member, a double reinforcing rib on the hook member extending out from the base for a portion of the length of the hook member sufficiently far to substantially assist in taking the downward strain of the conduit or cable, and from that point said double reinforcing ribs merging into a single reinforcing rib which extends to substantially the end of the hook member and assists in taking the outward strain of the conduit or cable.

3. A new article of manufacture comprising a conduit and cable clamp having a comparatively thin web base having reinforcing ribs both on its bearing and non bearing surfaces, a hook member, a double reinforcing rib on the hook member extending out from the base for a portion of the length of the hook member sufficiently far to substantially assist in taking the downward strain of the conduit or cable, and from that point said double reinforcing ribs merging into a single reinforcing rib which extends to substantially the end of the hook member and assists in taking the outward strain of the conduit or cable said double reinforcing ribs on the hook merging into the reinforcing ribs on the non bearing surface of the base.

4. A new article of manufacture comprising a conduit and cable clamp having a base, reinforcing ribs extending around the outer portion of the non bearing surface, a raised ring in said base said ring being of substantially the same height as the reinforcing ribs to permit a bolt head to be readily manipulated by a wrench, a hook member, a double reinforcing rib on the hook member extending out from the base for a portion of the length of the hook member sufficiently far to substantially assist in taking the downward strain of the conduit or cable, and from that point said double reinforcing ribs merging into a single reinforcing rib which extends to substantially the end of the hook member and assists in taking the outward strain of the conduit or cable.

5. A new article of manufacture comprising a conduit and cable clamp having a comparatively thin substantially diamond shape base, the bearing surface of which is substantially concave and provided with reinforcing ribs which tend to bite into the surface of the wall or the support and prevent rocking motion of the clamp, a hook member, the non bearing surface being also provided with reinforcing ribs which extend around the base and extend out onto the hook member for a portion of its length as a pair of reinforcing ribs, and then merge into one reinforcing rib and extend as such to substantially the end of the hook member.

HENRY W. PLEISTER.

Witnesses:
  MARY R. RYAN,
  A. M. WILLIAMS.

Copies of this patent may be obtained for five cents each, by addressing the "Commissioner of Patents, Washington, D. C."